(12) United States Patent
Moyer

(10) Patent No.: US 8,762,652 B2
(45) Date of Patent: Jun. 24, 2014

(54) CACHE COHERENCY PROTOCOL IN A DATA PROCESSING SYSTEM

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1666 days.

(21) Appl. No.: 12/112,502

(22) Filed: Apr. 30, 2008

(65) Prior Publication Data

US 2009/0276578 A1 Nov. 5, 2009

(51) Int. Cl.
*G06F 12/00* (2006.01)

(52) U.S. Cl.
USPC .................. 711/144; 711/E12.069; 711/142; 711/135

(58) Field of Classification Search
USPC .......................................... 711/141
See application file for complete search history.

(56) References Cited

U.S. PATENT DOCUMENTS

| | | | |
|---|---|---|---|
| 5,506,971 A | 4/1996 | Gullette et al. | |
| 5,522,057 A | 5/1996 | Lichy | |
| 5,699,548 A | 12/1997 | Choudhury et al. | |
| 5,761,725 A | 6/1998 | Zeller et al. | |
| 5,860,114 A | 1/1999 | Sell | |
| 5,920,892 A | 7/1999 | Nguyen | |
| 6,021,468 A | 2/2000 | Arimilli et al. | |
| 6,292,906 B1 | 9/2001 | Fu et al. | |
| 6,601,144 B1 | 7/2003 | Arimilli et al. | |
| 6,845,432 B2 | 1/2005 | Maiyuran et al. | |
| 7,234,029 B2 | 6/2007 | Khare et al. | |
| 7,373,462 B2 | 5/2008 | Blumrich et al. | |
| 2003/0005236 A1 | 1/2003 | Arimilli et al. | |
| 2003/0195939 A1 | 10/2003 | Edirisooriya et al. | |
| 2004/0123046 A1 | 6/2004 | Hum et al. | |
| 2005/0071573 A1 | 3/2005 | Dodson et al. | |
| 2005/0251626 A1 * | 11/2005 | Glasco ......................... | 711/133 |
| 2005/0251628 A1 | 11/2005 | Jarvis et al. | |
| 2008/0091884 A1 * | 4/2008 | Piry et al. ..................... | 711/141 |
| 2008/0183972 A1 | 7/2008 | Dieffenderfer | |

OTHER PUBLICATIONS

U.S. Appl. No. 12/053,761 filed.
Office Action mailed Feb. 18,2011 in U.S. Appl. No. 12/112,508.
U.S. Appl. No. 12/112,796, filed Apr. 30, 2008.
U.S. Appl. No. 11/969,112, filed Jan. 3, 2008.
PCT Application No. PCT/US2009/034866; Search Report and Written Opinion mailed Sep. 30, 2009.
Office Action mailed May 26, 2011 in U.S. Appl. No. 12/112,796.

(Continued)

*Primary Examiner* — Reginald Bragdon
*Assistant Examiner* — Hamdy S Ahmed
(74) *Attorney, Agent, or Firm* — Joanna G. Chiu; David G. Dolezal

(57) ABSTRACT

A data processing system includes a first master having a cache, a second master, a memory operably coupled to the first master and the second master via a system interconnect. The cache includes a cache controller which implements a set of cache coherency states for data units of the cache. The cache coherency states include an invalid state; an unmodified non-coherent state indicating that data in a data unit of the cache has not been modified and is not guaranteed to be coherent with data in at least one other storage device of the data processing system, and an unmodified coherent state indicating that the data of the data unit has not been modified and is coherent with data in the at least one other storage device of the data processing system.

17 Claims, 8 Drawing Sheets

(56) References Cited

OTHER PUBLICATIONS

Final Office Action mailed Jul. 7, 2011 in U.S. Appl. No. 12/112,508.
Office Action mailed Nov. 16, 2011 in U.S. Appl. No. 12/112,796.
Office Action mailed Apr. 27, 2012 in U.S. Appl. No. 12/112,796.
Office Action mailed Jun. 8, 2012 in U.S. Appl. No. 12/112,508.
Pre-Appeal Brief Conference Decision mailed Feb. 10, 2012 in U.S. Appl. No. 12/112,796.
U.S. Appl. No. 12/112,508, Inventor William C. Moyer, "Cache Coherency Protocol in a Data Processing System", Filed Apr. 20, 2008, Office Action—Notice of Allowance, mailed Dec. 7, 2012.
Office Action mailed Dec. 10, 2013 in U.S. Appl. No. 12/112,796.
Office Action mailed Nov. 5, 2012 in U.S. Appl. No. 12/112,796.

* cited by examiner

FIG. 4

| HBURST[2:0] | TYPE | DESCRIPTION |
|---|---|---|
| 000 | SINGLE | SINGLE TRANSFER |
| 001 | INCR | INCREMENTING BURST OF UNSPECIFIED LENGTH |
| 010 | WRAP4 | 4-BEAT WRAPPING BURST |
| 011 | INCR4 | 4-BEAT INCREMENTING BURST |
| 100 | WRAP8 | 8-BEAT WRAPPING BURST |
| 101 | INCR8 | 8-BEAT INCREMENTING BURST |
| 110 | WRAP16 | 16-BEAT WRAPPING BURST |
| 111 | INCR16 | 16-BEAT INCREMENTING BURST |

SNOOP THIS: 000, 001
DO NOT SNOOP THIS: 010–111

FIG. 5

| HPROT[3] CACHEABLE | HPROT[2] BUFFERABLE | HPROT[1] PRIVILEGED | HPROT[0] DATA/OPCODE | DESCRIPTION |
|---|---|---|---|---|
| – | – | – | 0 | OPCODE FETCH |
| – | – | – | 1 | DATA ACCESS |
| – | – | 0 | – | USER ACCESS |
| – | – | 1 | – | PRIVILEGED ACCESS |
| – | 0 | – | – | NOT BUFFERABLE |
| – | 1 | – | – | BUFFERABLE |
| 0 | – | – | – | NOT CACHEABLE |
| 1 | – | – | – | CACHEABLE | ue # CACHE COHERENCY PROTOCOL IN A DATA PROCESSING SYSTEM

CROSS-REFERENCE TO RELATED APPLICATION(S)

This application is related to U.S. patent application Ser. No. 12/112,508, filed on even date, entitled "Cache Coherency Protocol in a Data Processing System," naming William C. Moyer as inventor, and assigned to the current assignee hereof.

BACKGROUND

1. Field

This disclosure relates generally to data processing systems, and more specifically, to a cache coherency protocol in a data processing system.

2. Related Art

Cache coherency protocols are typically used in multi-processor systems. One such protocol is the MESI protocol. However, in order to implement a MESI protocol, the bus protocol of the multi-processor system needs to support particular bus transaction types. Furthermore, the MESI protocol may be too complex or costly for lower-end systems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 illustrates a table which provides encodings of an HBURST bus signal, in accordance with one bus protocol.

FIG. 5 illustrates a table which provides encodings of an HPROT bus signal, in accordance with one bus protocol.

DETAILED DESCRIPTION

Figure 1:
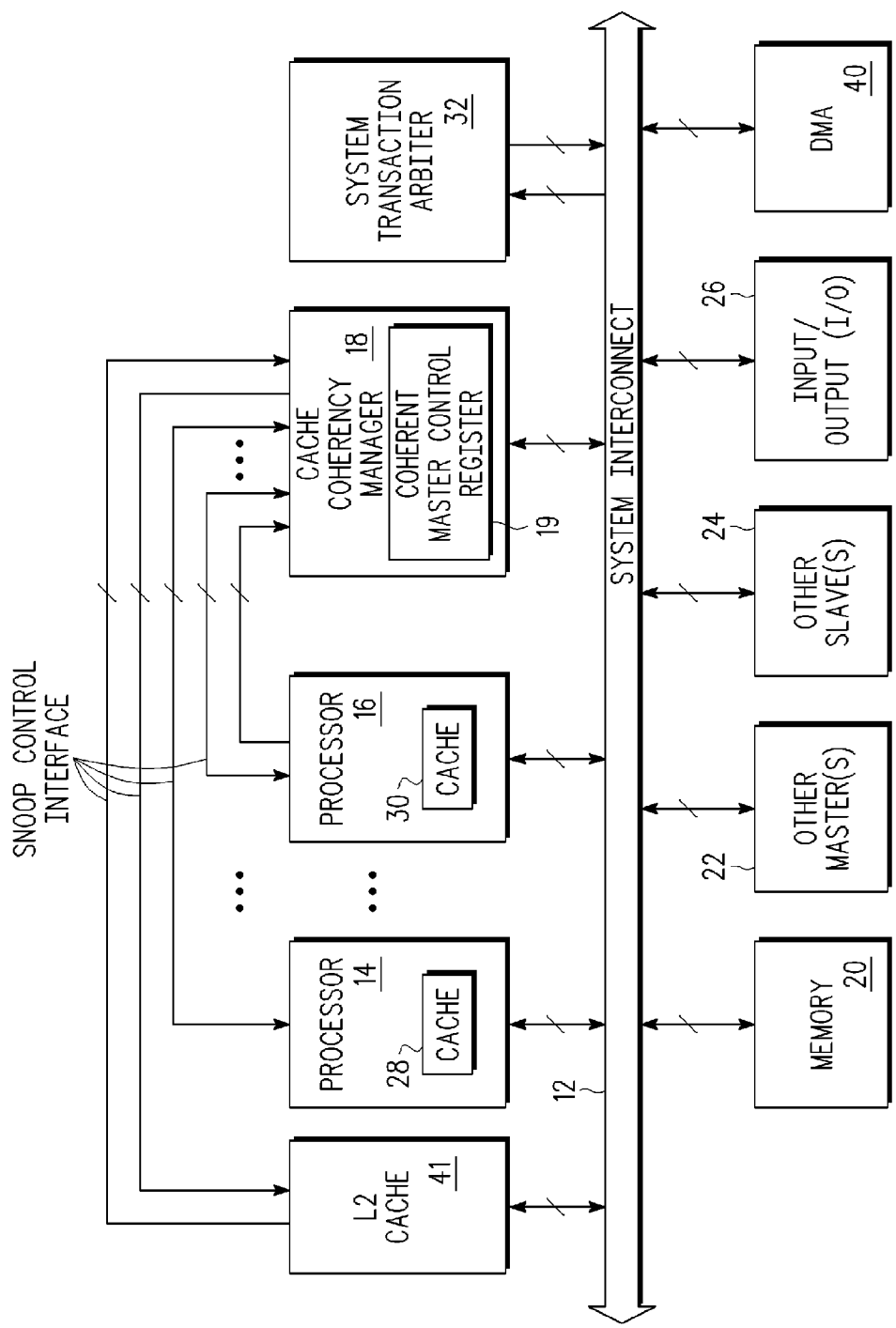
FIG. 1 illustrates a data processing system in accordance with one embodiment of the present invention.

In one embodiment, a cache coherency protocol may use separate transitions and states for coherent and non-coherent writes. In one embodiment, this cache coherency protocol uses the write-through page attribute provided by a memory management unit (MMU) as a control value to define one or more transitions between coherency states. In one embodiment, the cache coherency protocol relies on a write-through operation for coherent traffic, and supports copyback transactions for non-coherent data. Furthermore, this cache coherency protocol may be used with standard bus protocols which do not currently support cache coherency. Also, in one embodiment, a subset of bus transactions may be selected for which cache coherency is required. That is, based on one or more factors, a particular bus transactions may or may not result in a cache coherency operation (e.g. may or may not result in generation of a snoop request). Furthermore, in one embodiment, the one or more factors used to perform selective snooping are present in existing industry standard bus protocols such that no additional signaling mechanisms or other modifications to standard bus protocols are required.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" preceding a number indicates that the number is represented in its binary or base two form.

FIG. 1 illustrates a block diagram of a data processing system 10 in accordance with one embodiment of the present invention. System 10 may be a system-on-chip. System 10 may be implemented on a single integrated circuit or on a plurality of integrated circuits. System 10 includes a system interconnect 12 which may be, for example, a system bus. In one embodiment, the system interconnect 12 is a system bus which operates according to the AMBA AHB or AXI protocol (AMBA, AXI, and AHB are trademarks of ARM Ltd.). System 10 includes any number of processors, such as processors 14 and 16, a system transaction arbiter 32, a cache coherency manager 18, a memory 20, a level 2 cache 41, other master(s) 22, other slave(s) 24, an input/output (I/O) module 26, and a direct memory access (DMA) module 40, each bidirectionally coupled to system interconnect 12. Processor 14 includes a cache 28, and processor 16 includes a cache 30. Cache coherency manager 18 includes a coherent master control register 19. Cache coherency manager 18 is also bidirectionally coupled to each of L2 cache 41, processor 14, and processor 16 via a snoop control interface which may be separate to system interconnect 12. Additionally, cache coherency manager 18 may be bidirectionally coupled to other masters within system 10. Alternate embodiments of system 10 may include additional circuitry which is not illustrated in FIG. 1, or may include less circuitry than illustrated. In some embodiments, cache coherency manager 18 may be distributed within processors 14 and 16, or may not be present.

Figure 2:
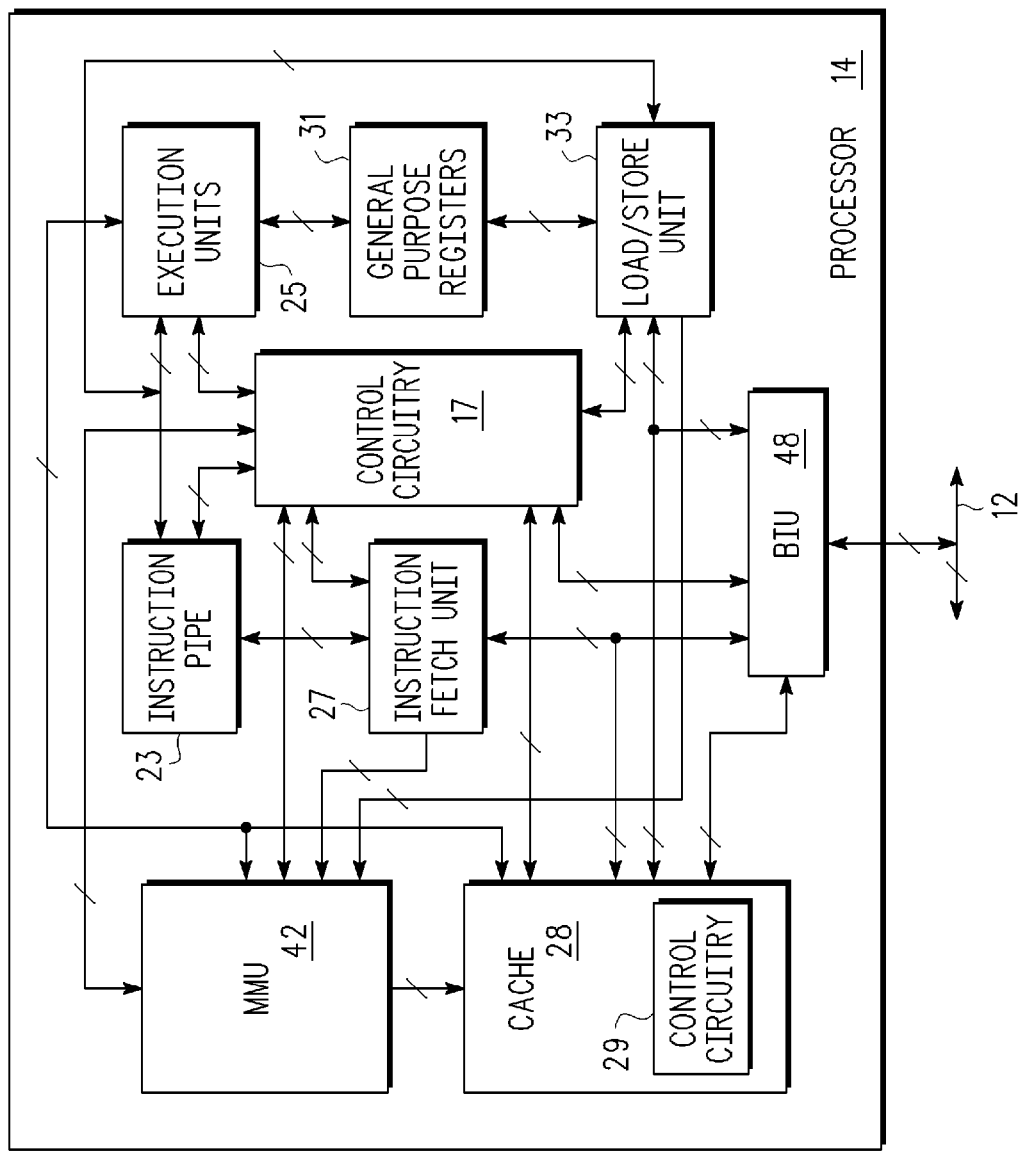
FIG. 2 illustrates a portion of a processor of the data processing system of FIG. 1, in accordance with one embodiment of the present invention.

FIG. 2 is a block diagram of processor 14 associated with data processing system 10 of FIG. 1. Processor 14 may be implemented to perform operations in a pipelined fashion, and may include an instruction pipe 23, execution units 25, instruction fetch unit 27, control circuitry 17, general purpose registers 31, load/store unit 33, bus interface unit (BIU) 48, a memory management unit (MMU) 42, and cache 28. In one embodiment, control circuitry 17 is bidirectionally coupled to each of BIU 48, cache 28, MMU 42, instruction fetch unit 27, instruction pipe 23, execution units 25, and load/store unit 33. Instruction pipe 23 is bidirectionally coupled to instruction fetch unit 27, execution units 25, and load/store unit 33. Execution units 25 is bidirectionally coupled to each of MMU 42, cache 28, and general purpose registers 31. Load/store unit is bidirectionally coupled to general purpose registers 31, MMU 42, and cache 28. Processor 14 may communicate with other components of data processing system 10 via system interconnect 12 coupled to BIU 48. Cache 28 includes control circuitry 29 which, in one embodiment, implements a cache coherency protocol for cache 28 based, at least in part, on a memory page attribute provided by MMU 42. Cache 28 includes a plurality of cache entries (also referred to as cache lines) where each cache entry includes an address tag, corresponding data, and status information, including information related to its current cache coherency protocol state. Note that processor 14, with the exception of control circuitry 29 and any circuitry for implementing the cache coherency protocol, operates as known to one skilled in the art and therefore, will not be discussed in further detail herein.

MMU 42, as known in the art, translates virtual addresses (which may be received from, for example, execution units 25, load/store unit 33, and instruction fetch unit 27) to physical addresses. MMU 42 provides the translated addresses to cache 28. That is, MMU 42 provides the physical address along with the page attributes for the page of memory corresponding to the physical address. For example, entries within cache 28 may correspond to storage locations of memory 20, where memory 20 includes units of storage referred to as pages. Therefore, the page attributes provided by MMU 42 along with the physical address translation information may be programmed into storage circuitry of MMU 42 (or elsewhere within processor 14) and correspond to the particular page which includes the provided physical address. In one embodiment, these page attributes includes a write-through required attribute (W) and any one of the following attributes: caching inhibited (I), memory coherence required (M) (which may also be referred to as globally shared (SG)), guarded (G), Endianness (E), and User-Definable (e.g. U0, U1, U2, U3). For example, in one embodiment, MMU 42 includes a translation look-aside buffer (TLB) whose entries store address translations along with these attributes, and thus controls the manner in which processor 14 performs storage accesses in the page associated with each TLB entry. In one embodiment, the page attributes for each page includes both W and M, where each of the W and M attributes can be set independently of each other.

Typically, cache coherency is supported to allow for memory coherency in multi-master systems. Coherency may be maintained though the use of cache coherency operations. In one embodiment, these cache coherency operations includes snoop requests (i.e. snoop invalidation requests) provided to a processor, such as processor 14. In one embodiment, these snoop requests are provided by cache coherency manager 18 to each of processors 14 and 16. These snoop invalidation requests are received by the processor so that the processor can determine if the addresses corresponding to the snoop invalidation requests are stored within the cache. Therefore, a cache coherency operation may refer to a snoop look-up where a look-up in the cache is performed to determine whether the cache contains data associated with the snooped transaction. That is, a cache coherency operation may include searching at least one cache of the data processing system (such as data processing system 10) to determine whether at least one cache contains data associated with the memory address of the snooped bus transaction. Then, if the cache does contain data associated with the snooped transaction (includes an entry matching the memory address corresponding to the snoop request), then the processor can perform the appropriate coherency operation for that entry or over-write that entry. In one embodiment, a snoop invalidation coherency operation is utilized in the cache coherency protocol, and this matching entry is invalidated because it is likely that the snooped transaction, which is performed by another bus master, is modifying the data stored at that address. Alternatively, note that a cache coherency operation can refer to the changing of the state of a cache entry.

Figure 3:
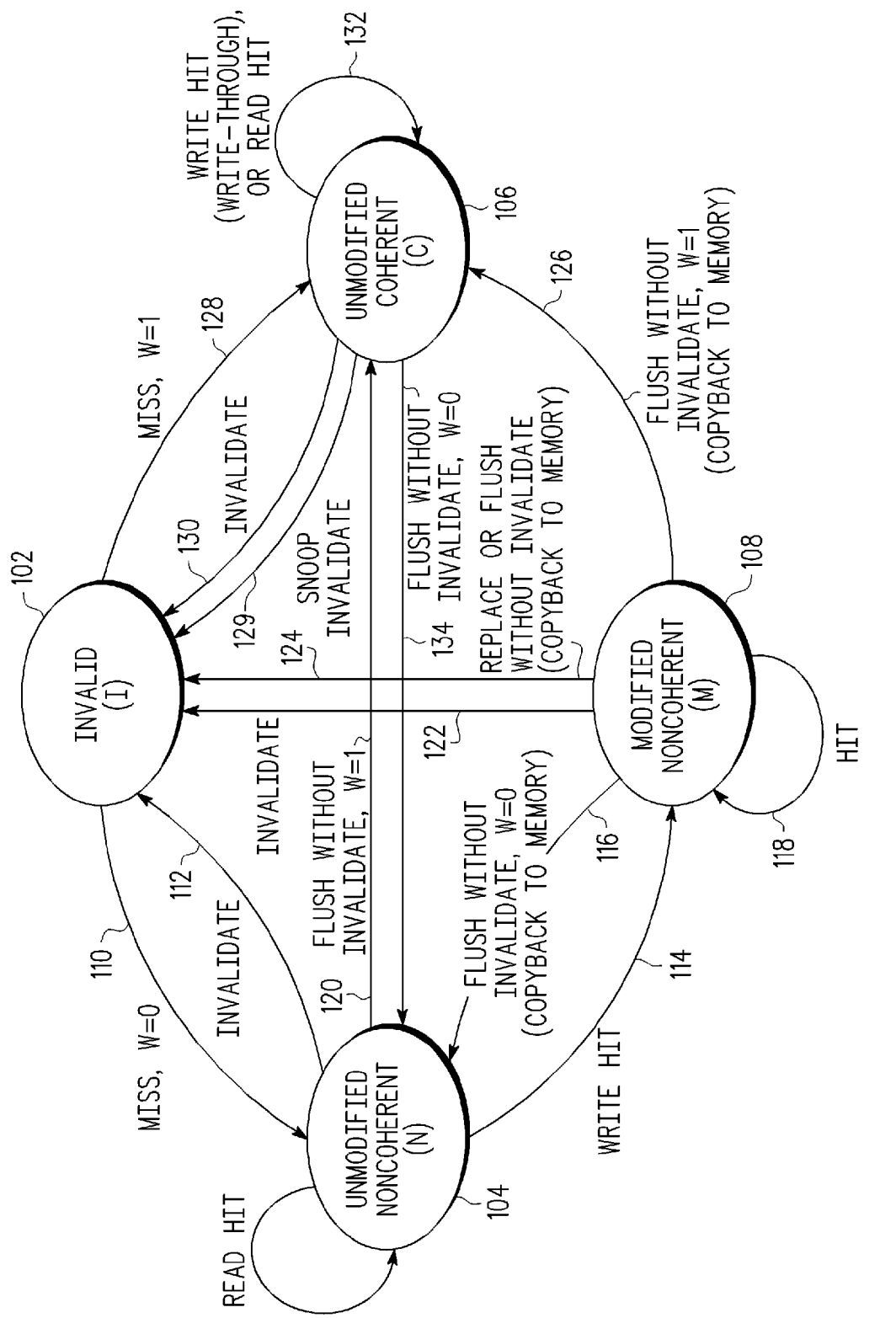
FIG. 3 illustrates a state diagram of a cache coherency protocol implemented by the processor of FIG. 2, in accordance with one embodiment of the present invention.

FIG. 3 illustrates a cache coherency protocol 100 having four states: a modified, non-coherent state (M), an invalid state (I), an unmodified, non-coherent state (N), and an unmodified coherent state (C). In this four state protocol, separate transitions and states are used for coherent and non-coherent writes. In one embodiment, cache coherency protocol 100 uses the W page attribute provided by MMU 42 as a control value to define one or more transitions between coherency states. In one embodiment, the cache coherency protocol relies on a write-through operation for coherent traffic, and supports copyback transactions for non-coherent data. For example, as will be described further below, coherent writes utilize the I and C states, and are performed as write-through writes. Non-coherent writes utilize the I, N, and M states and are performed as copyback writes.

The state diagram of FIG. 3 will be described be described in reference to processor 14. That is, in one embodiment, control circuitry 29 within cache 28 implements the state diagram of FIG. 3. Each cache entry in cache 28 includes one or more status indicators to indicate the state (M, I, N, or C) of the cache entry. (Note that a cache entry may also be referred to as a cache line.) As illustrated in FIG. 3, state 102 corresponds to the I state, state 104 corresponds to the N state, state 108 corresponds to the M state, and state 106 corresponds to the C state. As used with respect to cache coherency protocol 100, when a cache entry is "unmodified," the data of the cache entry in cache 28 of processor 14 has not been modified with respect to the copy in memory 20 since it was allocated. When a cache entry is "modified," the data of the cache entry in cache 28 of processor 14 has been modified with respect to the copy in memory 20 since it was allocated. When a cache entry is "coherent," the data of the cache entry in cache 28 is the same as in memory 20 and as in any valid entry in any cache in system 10 (such as cache 30) corresponding to the same address location. "Non-coherent" refers to being non-coherent with other caches. That is, when a cache entry is "non-coherent," the data of the cache entry in cache 28 may have a different value than a valid entry of another cache, such as cache 30, corresponding to the same address location of memory 20. Note that since "non-coherent" refers to being non-coherent with other caches, when a cache entry is "non-coherent", the data of the cache entry may be the same as in memory 20. Non-coherency may occur when cache coherency operations have not been performed for a particular address location in memory.

Coherent cache entries may be in either the C state or the I state. Cache entries which do not require coherency may assume the I, N, or M states. Note that no Modified or Shared state (as is used in the MESI protocol) is supported for coherent cache entries, thus no snoop copyback or intervention operations are required. Non-coherent cache entries may still assume a modified state. In one embodiment, memory regions (such as in memory 20) requiring coherency operations are marked as "memory coherence required" (with its M bit set to one) and as "write through required" (with its W bit set to one). Note that protocol 100 may be used with a bus protocol which does not comprehend or support cache coherency operations, such as, for example, the AMBA AHB or AXI protocol. With a bus protocol which does not support cache coherency, the MESI protocol cannot be implemented. For example, there may be no way to signal a transition from the S state to the M state of the MESI protocol, which utilizes an "address only transaction", which does not exist in the AMBA AHB protocol. Furthermore, such a bus protocol which does not support MESI cache coherency transactions does not support "read with intent to modify" transactions which are utilized for implementing transitions from the I state to the E state in the MESI protocol. Other transaction types required for such a protocol also are not defined by the AMBA AHB or AXI bus protocols. Therefore, in one embodiment, note that cache coherency protocol 100 may be overlaid on existing bus protocols which currently do not support cache coherency.

Referring to FIG. 3, when a cache entry is in the invalid state, and a cache miss occurs which results in an allocation to the invalid cache entry, the W page attribute is used to determine whether to transition to state N (a non-coherent state) or state C (a coherent state). When the cache miss occurs and W=0, indicating that write-through is not performed for this address, then the state of the cache entry transitions from state I to state N via transition 110. Since a write-through is not performed for this address, the data of the cache entry cannot be guaranteed to be coherent. Since a write-through is not performed, write transactions to this cache entry are not placed on system interconnect 12 and thus the transactions cannot be snooped by cache coherency manger 19 (or by other caches). Therefore, since no coherency operation will be performed, it is considered non-coherent. Since the cache entry is newly allocated, its data is considered unmodified.

However, when a cache miss occurs and W=1, indicating that a write-through is performed for writes to this address, then the state of the cache entry transitions from state I to state C via transition 128. Since a write-through is performed for writes to this address, coherency is maintained. For example, for a write-through on a write miss, the data stored in the cache entry newly allocated upon transition 128 is also provided via system interconnect 12 to memory 20. For a write-through on a read miss, data for storage into the newly allocated cache entry is provided by memory 20 to processor 14 via system interconnect 12. Therefore, in performing a write-through, the data stored in the newly allocated cache entry is provided via system interconnect 12 which is monitored by cache coherency manager 18. Therefore, cache coherency manger 18 can perform a cache coherency operation by snooping the address on system interconnect 12 corresponding to the write-through transaction and perform a cache coherency operation. For example, cache coherency manager 18 can provide a snoop invalidate request to processor 16 such that processor 16 can determine if the snooped address hits in cache 30, and if so, invalidate it.

Once in state C, any read or write hit to the cache entry causes the cache entry to remain in state C. In the case of a write hit, a write-through is performed (since the W page attribute for the address was set), which allows coherency to be maintained. That is, upon a write-through, a cache coherency operation can be performed. For example, as described above, cache coherency manager 18 can generate snoop invalidate requests to processor 16 so that coherency can be maintained. A cache invalidate operation on the cache entry returns the cache entry to state I via transition 130. Note also that in state C, processor 14 may receive cache coherency operations, such as a snoop invalidate request, from cache coherency manager 18 when the data associated with the address of the cache entry is modified by another processor, such as by processor 16. In this case, a snoop invalidate request would hit the cache entry in processor 14 and cause the state of the cache entry to transition back to state I via transition 129.

Cache flush operations (which may also be referred to as flush cache operation commands) may also be performed by processor 14 or 16 to locations in memory 20 to cause memory 20 to be updated with any modified data present in cache 28 or cache 30, respectively. In one embodiment, these cache flush operations may be specified to flush any modified data to memory 20 and then leave the cache entry in a valid state (i.e. a cache flush operation without an invalidate), or alternatively, to flush any modified data to memory 20, and after performing the flush, to place the cache entry in an invalid state (i.e. a cache flush operation with invalidate). Cache flush operations provide an address for lookup in the cache, without apriori knowledge of the existence of data corresponding to the address being present in the cache, or the state of the cache entry containing the data. Therefore, in one embodiment, a flush operation is an operation in which a matching cache entry is written back to memory if the cache entry has any modified data. That is, if the cache line or entry is dirty, then it is written back to memory (e.g. memory 20). If there is no modified data, then no write back to memory is needed. Note also that a flush can be performed with or without invalidate.

Still referring to state C, upon performing a cache flush operation without an invalidate, the W page attribute is again checked to determine how to transition among states. If, upon a cache flush operation without an invalidate, the W page attribute is now cleared to zero (for example, as a result of software modifying the W page attribute for the corresponding page in memory 20), then the state of the cache entry transitions to state N via transition 134. That is, the cache entry is not invalid (since the flush is performed without an invalidation), but now, write-throughs will no longer be performed. Thus, again, coherency cannot be guaranteed. Also, since a flush is requested, the data is known to be unmodified at the completion of the flush operation. If a flush is performed with an invalidate, then, after the flush operation is performed, the cache entry is invalidated, thus transition back to state I (via transition 130). If a flush is performed without an invalidate, the cache entry remains valid after the flush operation, and the state (whether remaining in state C or transition to state N) is determined based on the W page attribute.

Once in state N, any read hit to the cache entry causes the cache entry to remain in state N. A cache invalidate operation on the cache entry returns the cache entry to state I via transition 112. A cache flush operation without invalidate may cause a transition to state C depending on the value of the W page attribute. For example, if a cache flush operation without invalidate is performed and the W page attribute is still zero, then the state of the cache entry remains in state N. If a cache flush operation without invalidate is performed and the W page attribute is now one (changed, for example, by software), then the state of the cache entry transitions from state N to state C, in which, due to the flush, the data remains unmodified, and, due to write-throughs now being performed, coherency is maintained. If a flush with invalidate is performed, then after the flush operation, the state of the cache entry transitions back to I (via transition 112). Upon a write hit to the cache entry in state N, the state of the cache entry transitions from state N to state M via transition 114. Therefore, the cache entry is still non-coherent since a write-through is not performed; however, now it is considered modified since it was modified since it was allocated upon transition 110 from state I to state N.

Once in state M, any hit to the cache entry causes the cache entry to remain in state M. If a cache flush operation without invalidate is performed, then, as described above, a copy back to memory (e.g. memory 20) is performed and the cache entry is not invalidated. Then, based on the W page attribute, the cache entry transitions from state M to state N or C. In the case of W=0, the state of the cache entry transitions back to state N via transition 116 where the data is now unmodified again (due to the flush operation) and write-throughs are not performed (thus not guaranteeing coherency). In the case of W=1, the state of the cache entry transitions back to state C via transition 126 where the data is now unmodified again (due to the flush operation) and write-throughs are performed (thus maintaining coherency). In state M, if a flush with invalidate is performed, then a copyback to memory is performed, as described above, and the cache entry is invalidated, returning the state of the cache entry to state I via transition 124. If a replace operation is performed on a cache entry in state M, the modified data is first copied back to memory 20. Then the data in the cache entry is first invalidated (transitioning to state I via transition 124) and then overwritten (resulting in a transition to state N or C, depending on the value of the W page attribute, since an allocate in effect occurs). Also, if an invalidate operation is performed, the state of the cache entry transitions from state M to state I via transition 122 without performing a copyback operation.

Therefore, it can be appreciated how a cache coherency protocol may use separate transitions and states for coherent and non-coherent writes. In one embodiment, cache coherency protocol 100 uses the W page attribute provided by MMU 42 as a control value to define one or more transitions between coherency states. In one embodiment, the cache coherency protocol relies on a write-through operation for coherent traffic, and supports copyback transactions for non-coherent data. Therefore, a cache coherency protocol 100 may be used with standard bus protocols which do not provide for cache coherency operations.

In one embodiment, cache coherency manager 18 may select a subset of bus transactions for which cache coherency is required. That is, based on one or more factors, as will be discussed below in reference to FIGS. 4-9, particular types of transactions will or will not be snooped and thus will or will not result in a cache coherency operation. Furthermore, in one embodiment, the one or more factors used to perform selective snooping are present in existing industry standard bus protocols such as the AMBA AHB or AXI. In this manner, no additional signaling mechanisms or other modifications to standard bus protocols are required.

In one embodiment, cache coherency manager 18 snoops and performs cache coherency operations based on whether a bus transaction is a single beat transaction or a burst transaction. For example, in one embodiment, snooping and cache coherency operations are performed if the bus transaction is a single beat transaction but not if it is a burst transaction. This may be because bursts initiated by a processor are typically doing a copyback transaction, thus cache coherency operations are not needed for these burst transactions. However, in one embodiment, if the transaction is a burst transaction, but is initiated by DMA 40 rather than by a processor (such as processor 14 or 16), snooping is still performed because typically burst transactions initiated by a DMA are not performing a copyback, meaning cache coherency operations may still be needed. Therefore, in one embodiment, the decision whether or not to snoop may be based on both the type of bus transaction and which master or type of master initiated the bus transaction. As will be described below other factors or combination of factors may be used within system 10, such as by cache coherency manager 18 or other cache coherency control circuitry, to determine whether or not snooping is to be performed. Note that, in one embodiment, a master identifier (master ID) is provided with each bus transaction identifying which master initiated the transaction. The determination of mastership may be indicated as part of the bus transaction by the initiating master as an attribute of the transfer address, or may be indicated or signaled in other ways. In one embodiment, the determination of which masters to perform a coherency operation if a burst write access is initiated may be programmatically selected by a user of system 10. In one embodiment, a control register may be provided within system 10 to indicate one or more masters for which coherency operations should be performed, based on the type of transfer (burst or non-burst, or selective within a set of particular burst types).

Using the AMBA AHB protocol as an example, burst information is provided using a 3-bit bus signal, HBURST[2:0], which encodes eight possible types of transactions. These encodings are provided in FIG. 4. For example, a value of "000" for HBURST indicates a single transfer (i.e. a single beat transaction), whereas the other 7 values indicate different types of burst transactions. In one embodiment, when cache coherency manager 18 determines that the value of HBURST is 000 (indicating a single transfer), snooping will be performed; however, if it is determined that the value of HBURST is 010 (indicating a 4-beat wrapping burst), 011 (indicating a 4-beat incrementing burst), 100 (indicating an 8-beat wrapping burst), 101 (indicating an 8-beat incrementing burst), 110 (indicating a 16-beat wrapping burst), or 111 (indicating a 16-beat incrementing burst), snooping is not performed. Depending on the embodiment, when the value of HBURST is 001 (indicating an incrementing burst of unspecified length), snooping may or may not be performed. As discussed above, the decision whether to snoop or not may further be based on which master or type of master initiated the bus transaction or transfer.

In one embodiment, the decision whether or not to snoop may further be qualified by whether or not the current access (the current bus transaction) is cacheable or not. Still using the AMBA AHB protocol as an example, an HPROT[3:0] signal is provided with the access address of a bus transaction an indicates, for example, whether the transfer is an opcode fetch or data access, a privileged mode access or user mode access, and, for master with an MMU, indicate whether the current access is cacheable or not. The encodings for the HPROT[3:0] signal are provided in FIG. 5. For example, when HPROT[3] has a value of 0, snooping is not performed because the access of the bus transaction is not cacheable, whereas when HPROT [3] has a value of 1, snooping is performed because the access of the bus transaction is cacheable. Therefore, in addition to or instead of using the factors described above, the HPROT signal may also be used to determine whether or not snooping is to be performed. In another example embodiment, when HPROT[2] has a value of 0, snooping is not performed because the access of the bus transaction is not bufferable, whereas when HPROT[2] has a value of 1, snooping is performed because the access of the bus transaction is bufferable. In some embodiments, depending on the particular master which initiates the bus access, the values of the HPROT bits may be programmatically used to control whether a coherency operation is performed. Therefore, in addition to or instead of using the factors described above, the HPROT signals may also be used to determine whether or not snooping is to be performed, optionally in conjunction with a determination of the identity of the master initiating a transaction. For example, it may be possible that a user of system 10 programs one or more control registers or register fields in such a manner as to effect coherency operations being performed for master X when HPROT[3]=1, for master Y when HPROT[2]=1, and for master Z when HPROT[3]=1 and HPROT[2]=0. Alternatively, other realizable control combinations may be used.

Figure 6:
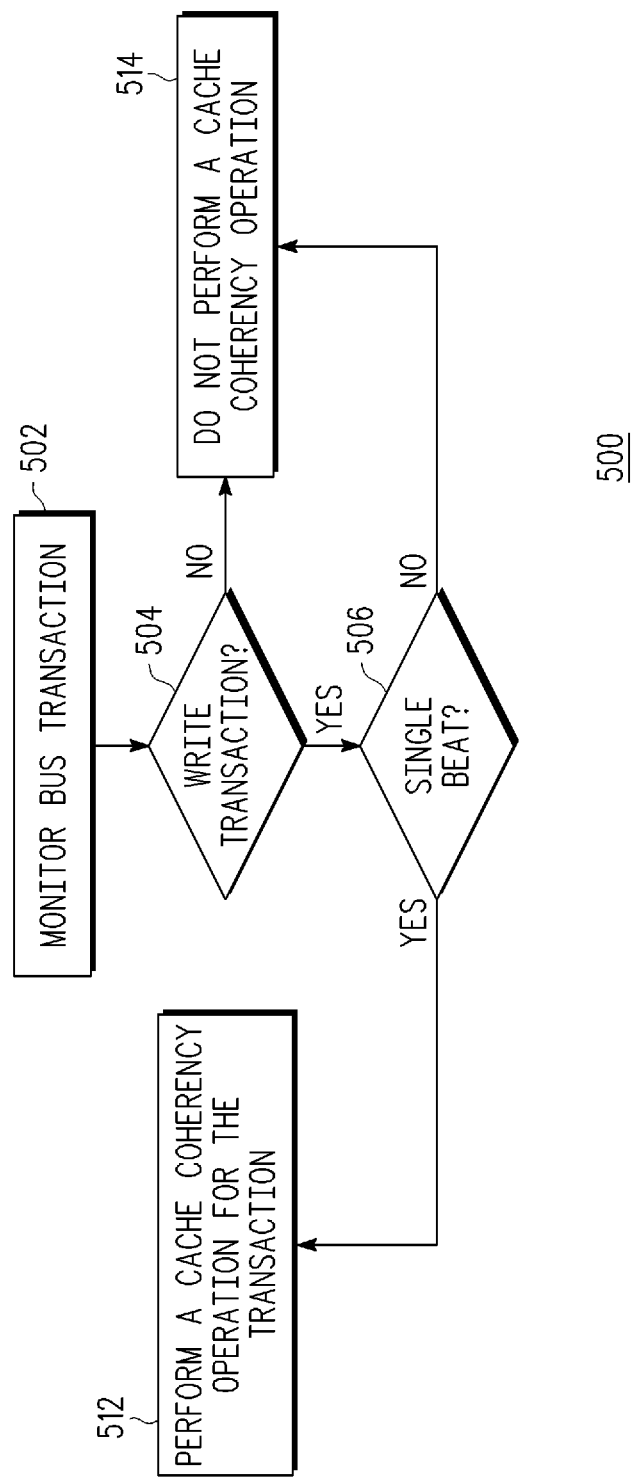
FIGS. 6-9 illustrate, in flow diagram form, various embodiments for determining whether cache coherency operations (e.g. snooping) are to be performed.

FIGS. 6-9 illustrates various examples of flow diagrams for determining whether cache coherency operations (e.g. snooping) are to be performed. As discussed above, a cache coherency operation may include generating a snoop request to other caches, if any, within system 10 where those caches then process that snoop request. In one embodiment, the cache coherency operation may include changing of the state of a cache entry. In one embodiment, each of the flows may be implemented by cache coherency manager 18. Alternatively, other cache coherency control circuitry may perform any of these functions and be present anywhere in system 10. In one embodiment, each individual cache or cache control circuitry may perform the functions illustrated in FIGS. 6-9. FIG. 6 illustrates a flow 500 which begins with block 502 in which a bus transaction is initiated by a bus master, such as, for example, processor 14, processor 16, DMA 40, or other master 22. Flow proceeds to decision diamond 504 where it is determined whether or not a write transaction is being performed. If not, flow proceeds to block 514 where a cache coherency operation is not performed. That is, in the illustrated embodiment of FIG. 6, read transactions are not snooped. If, at decision diamond 504, it is determined that the bus transaction is a write transaction, flow proceeds to decision diamond 506 where it determined whether the bus transaction is a single beat (i.e. single transfer) transaction. If not, flow proceeds to block 514. If the bus transaction is a single beat transaction, flow proceeds to block 512 where a cache coherency operation on the data of the write transaction is performed. Therefore, in flow 500, a cache coherency operation is only performed if the bus transaction is a single beat write transaction.

Figure 7:
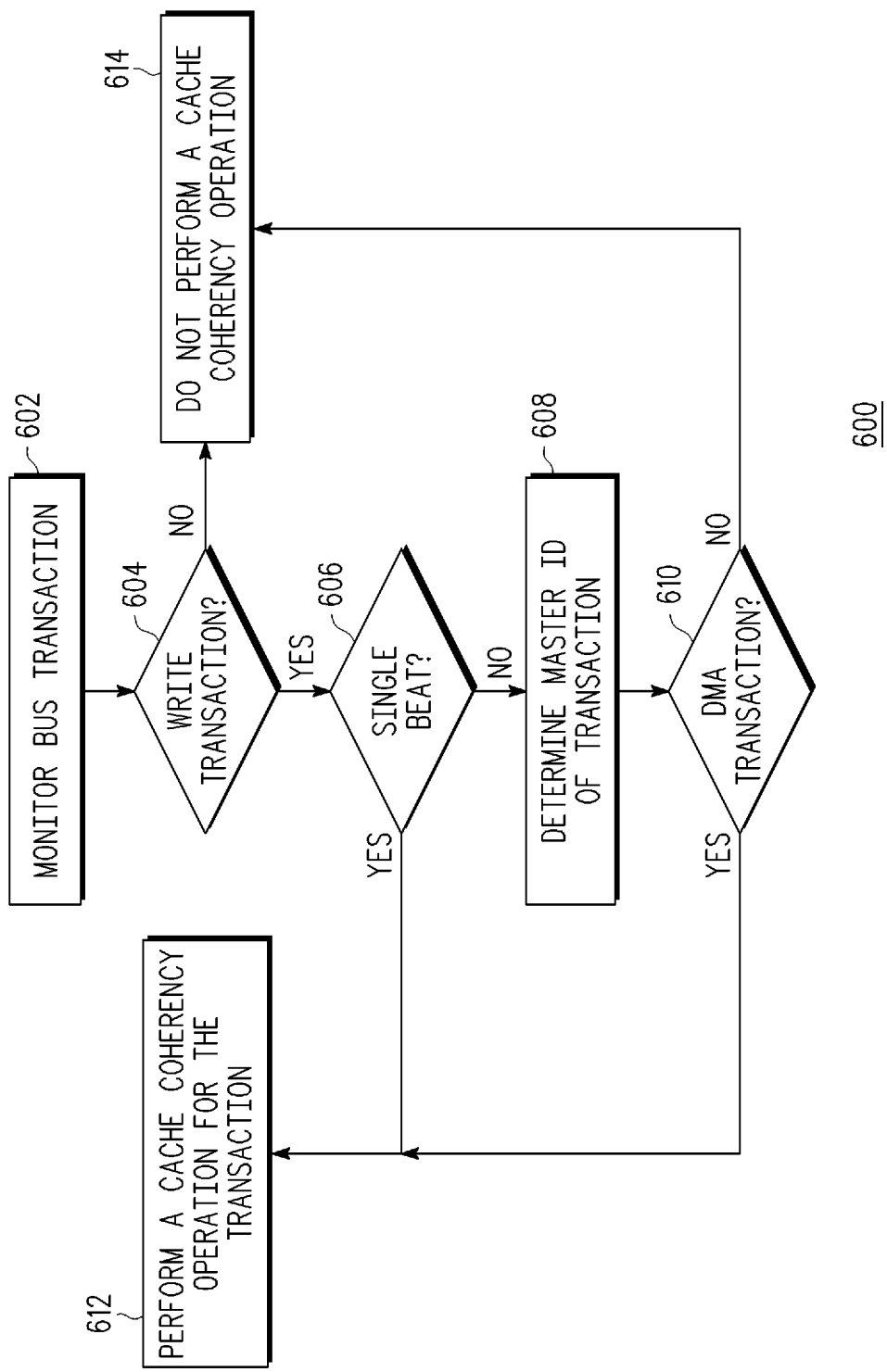

FIG. 7 illustrates a flow 600 which begins with block 602 in which a bus transaction is initiated by a bus master, such as, for example, processor 14, processor 16, DMA 40, or other master 22. Flow proceeds to decision diamond 604 where it is determined whether or not a write transaction is being performed. If not, flow proceeds to block 614 where a cache coherency operation is not performed. That is, in the illustrated embodiment of FIG. 7, read transactions are not snooped. If, at decision diamond 604, it is determined that the bus transaction is a write transaction, flow proceeds to decision diamond 606 where it determined whether the bus transaction is a single beat (i.e. single transfer) transaction. If so, flow proceeds to block 612 where a cache coherency operation on the data of the write transaction is performed. If not, flow proceeds to block 608 where the master ID of the transaction is determined. That is, as described above, in one embodiment, a master ID is provided with each bus transaction to identify the initiating master. Flow then proceeds to decision diamond 610 where it is determined if the master ID indicates a DMA, such as DMA 40. If so, then flow proceeds to block 612 where a cache coherency operation on the data of the write transaction is performed. In not, then flow proceeds to block 614. That is, even if the write transaction is a burst write (i.e. the "no" branch from decision diamond 606), a cache coherency operation is still performed if the imitating master is a DMA. However, if the write transaction is a burst write and the initiating master is not a DMA, then no cache coherency operation is performed, since it is likely, in this case, that the burst transaction is a copyback transaction.

Figure 8:
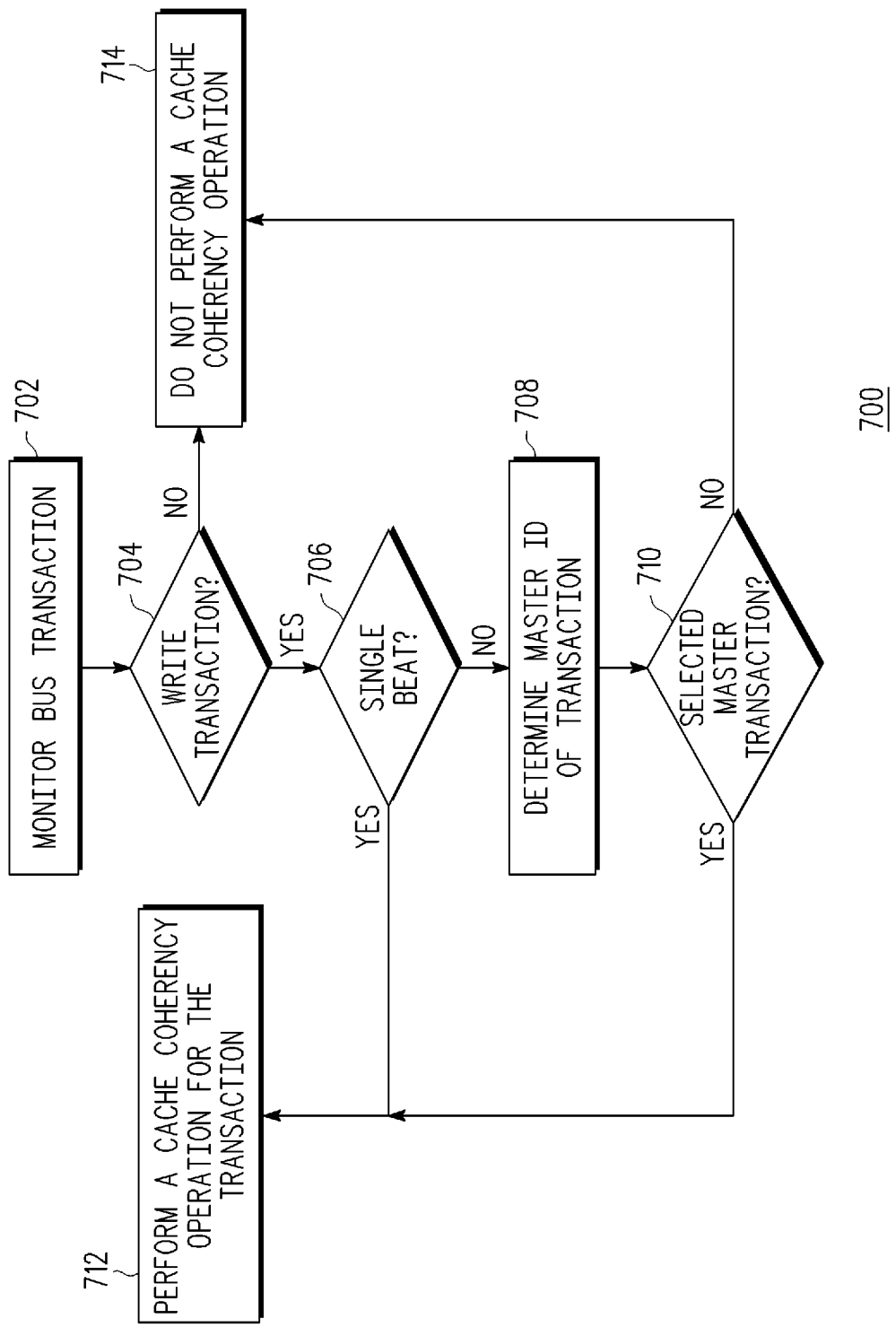

FIG. 8 illustrates a flow 700 which begins with block 702 in which a bus transaction is initiated by a bus master, such as, for example, processor 14, processor 16, DMA 40, or other master 22. Flow proceeds to decision diamond 704 where it is determined whether or not a write transaction is being performed. If not, flow proceeds to block 714 where a cache coherency operation is not performed. That is, in the illustrated embodiment of FIG. 8, read transactions are not snooped. If, at decision diamond 704, it is determined that the bus transaction is a write transaction, flow proceeds to decision diamond 706 where it determined whether the bus transaction is a single beat (i.e. single transfer) transaction. If so, flow proceeds to block 712 where a cache coherency operation on the data of the write transaction is performed. If not, flow proceeds to block 708 where the master ID of the transaction is determined. That is, as described above, in one embodiment, a master ID is provided with each bus transaction to identify the initiating master. Flow then proceeds to decision diamond 710 where it is determined if the master ID indicates a selected master. If so, then flow proceeds to block 712 where a cache coherency operation on the data of the write transaction is performed. In not, then flow proceeds to block 714. In one embodiment, cache coherency manager 18 includes a coherent master control register 19 which indicates which masters require coherency. For example, control register 19 may be programmable with the IDs of those masters in system 10 for which cache coherency is desired or required. Therefore, in decision diamond 710 of FIG. 8, the master ID of the master which initiates the bus transaction in block 702 can be compared to control register 19 to determine if the master ID of the initiating master corresponds to a selected master indicated by control register 19. Alternatively, other circuitry or methods may be used to identify for which imitating masters a cache coherency operation should be performed. Therefore, even if the write transaction is a burst write (i.e. the "no" branch from decision diamond 606), a cache coherency operation may still be performed if the imitating master is a master selected by coherent master control register 19. In alternate embodiments, the determination step 710 may be performed utilizing other predetermined selection criteria within system 10. In one embodiment, this selection criteria may be programmed by a user of system 10.

Figure 9:
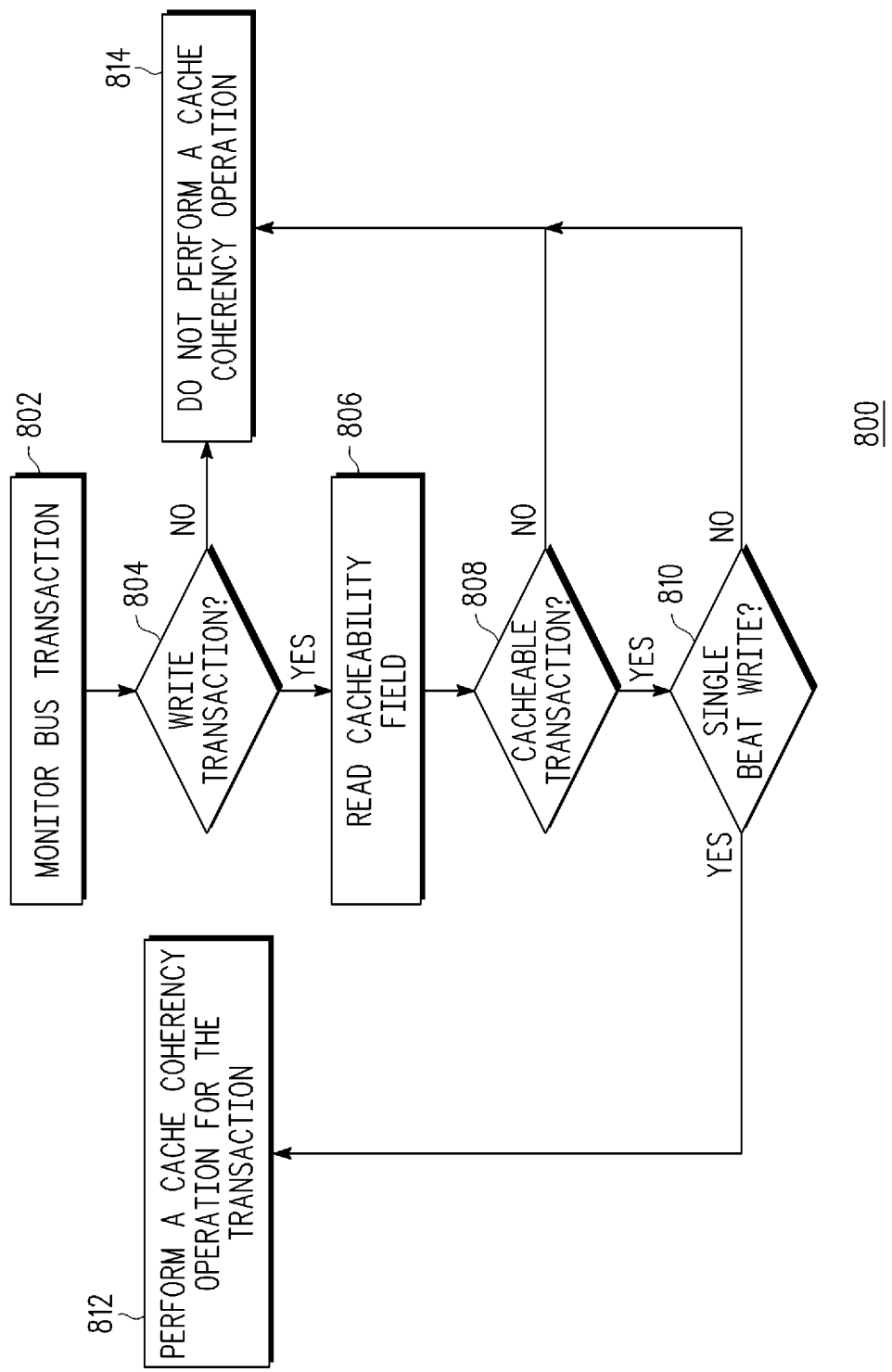

FIG. 9 illustrates a flow 800 which begins with block 802 in which a bus transaction is initiated by a bus master, such as, for example, processor 14, processor 16, DMA 40, or other master 22. Flow proceeds to decision diamond 804 where it is determined whether or not a write transaction is being performed. If not, flow proceeds to block 814 where a cache coherency operation is not performed. That is, in the illustrated embodiment of FIG. 9, read transactions are not snooped. If, at decision diamond 804, it is determined that the bus transaction is a write transaction, flow proceeds to decision diamond 806 where a cacheability field or signal of the bus transaction is read. For example, this can refer to HPROT [3] or HPROT[2] described above. Flow then proceeds to decision diamond 808 where it is determined If the cacheability field or signal indicates a cacheable transaction or not. If not, flow proceeds to block 814. If so, flow proceeds to decision diamond 810 where it is determined if the write transaction is a single beat write. If not, flow proceeds to block 814. If so, flow proceeds to block 812 in which a cache coherency operation is performed for the write transaction. That is, in the example of FIG. 9, cache coherency operations are only performed on cacheable single write transactions. That is, burst transactions would result in no cache coherency operation, as would any transaction which is indicated as a non-cacheable transaction by, for example, a signal provided according to a bus protocol of system interconnect 12. In alternate embodiments, the determination step 808 may be followed by a determination step which identifies the master initiating the transaction in a similar manner to the determination performed by steps 708 and 710 of FIG. 8. In one embodiment, the result of this determination may serve as a further factor in deciding whether a cache coherency operation is to be performed for the bus transaction.

Therefore, it can be appreciated how a variety of different factors may be used, alone or in various combinations with each other, to determine whether or not cache coherency operations (e.g. snooping) is performed. This selective performance of cache coherency operations may, for example, be implemented using existing standard bus protocols.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory 20 may be located on a same integrated circuit as processors 14 and 16 or on a separate integrated circuit or located within another peripheral or slave discretely separate from other elements of system 10. Other slave(s) 24 and I/O circuitry 26 may also be located on separate integrated circuits or devices. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as memory 35 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Additional Text:

1. A data processing system (for example, 10), comprising:
   a first master (for example, 14), the first master including a cache (for example, 28);
   a second master (for example, 16);
   a memory (for example, 20), the memory operably coupled to the first master and the second master via a system interconnect (for example, 12);
   wherein the cache includes a cache controller (for example, 29), the cache controller implementing a set of cache coherency states (for example, I, N, C, M) for data units (for example, cache entries or cache lines) of the cache, the cache coherency states including:
   an invalid state (for example, I);
   an unmodified non-coherent state (for example, N), the unmodified coherent state indicating that data in a data unit of the cache has not been modified and is not guaranteed to be coherent with data in at least one other storage device of the data processing system; and
   an unmodified coherent state (for example, C), the unmodified coherent state indicating that the data of the data unit has not been modified and is coherent with data in the at least one other storage device of the data processing system.

2. The data processing system of item 1 wherein a transition from the invalid state to the unmodified non-coherent state of a data unit of the cache is made in response to a read miss to the cache wherein the data of the read miss is written to the data unit, wherein no cache coherency operation is performed on any other cache in the data processing system in response to the read miss.

3. The data processing system of item 1 wherein:
   in response to a write cache miss, a transition from the invalid state to the unmodified non-coherent state of a data unit of the cache where the data of the write miss is written, does not generate a cache coherency operation in the other caches in the data processing system.

4. The data processing system of item 1 wherein a transition from the invalid state to the unmodified non-coherent state of a data unit of the cache does not cause a look up operation into other caches of the data processing system to determine whether those caches contain a memory address corresponding to the data being written to the data unit.

5. The data processing system of item 1 wherein when a data unit of the cache is in the unmodified non-coherent state, snoop transactions directed towards that data unit do not result in a change of coherency state for that data unit.

6. The data processing system of item 1, wherein in response to a cache miss in which the data of the cache miss is written to a data unit of the cache:
   a transition (for example, transition 110) to the unmodified non-coherent state from the invalid state of the data unit of the cache is made in response to a write through required attribute indicating that a write through is not required for the data written to the data unit;
   a transition (for example, transition 128) to the unmodified coherent state from the invalid state of the data unit of the cache is made in response to the write through required attribute indicating that a write through is required for the data written to the data unit of the cache.

7. The data processing system of item 6 wherein:
   the cache miss is a write miss;
   the data of the write miss is not written in a subsequent copyback bus transaction to the memory if the write through required attribute indicates that a write through is required for the data of the write miss.

8. The data processing system of item 1 wherein the cache coherency states further include:
   a modified non-coherent state (for example, M), the modified non-coherent state indicating that data in a data unit of the cache has been modified and is not guaranteed to be coherent with the data in the at least one other storage device of the data processing system.

9. The data processing system of item 8 wherein a transition (for example, transition 114) from the unmodified non coherent state to the modified non-coherent state of a data unit of the cache is made in response to a write hit to the data of the data unit.

10. The data processing system of item 9 wherein:
when in the unmodified coherent state, a write hit to data of a data unit of the cache generates a write through of the data to the memory (for example, transition 132);
when in the unmodified non-coherent state, a write hit to the data of a data unit of the cache does not generate a write through operation of the data.

11. The data processing system of item 8 wherein a transition (for example, transition 116) from the modified non-coherent state to the unmodified non-coherent state of a data unit of the cache is made in response to a flush cache operation command for the data unit without an invalidate cache operation command for the data unit and a write through required attribute indicates that a write through is not required for the data of the data unit.

12. The data processing system of item 8 wherein a transition (for example, transition 126) from the modified non-coherent state to the unmodified coherent state of a data unit of the cache is made in response to a flush cache operation command for the data unit and a write through required attribute of the data indicates that a write through is required for the data.

13. The data processing system of item 8 wherein when a write through required attribute for data in a data unit indicates that a write through is not required for the data, a transition from the modified non-coherent state to the invalid state of the data unit of the cache is made in response to:
a flush cache operation command for the data unit without an invalidate cache operation command for the data unit, wherein the data is written to the memory with a copy-back bus transaction in response to the flush cache operation command (for example, transition 124); or
an invalidate cache operation command for the data unit (for example, transition 122).

14. The data processing system of item 1 wherein when a write through required attribute indicates that a write through is required for data of a data unit of the cache, a transition (for example, transition 120) to the unmodified coherent state from the unmodified non-coherent state of the data unit of the cache is made in response to a flush cache operation command for the data unit without an invalidate cache operation command for the data unit.

15. The data processing system of item 1 wherein when a write through required attribute indicates that a write through is not required for the data, a transition (for example, transition 134) to the unmodified non-coherent state from the unmodified coherent state of a data unit of the cache is made in response to a flush cache operation command for the data unit without a invalidate cache operation command for the data unit.

16. The data processing system of item 1 wherein a transition from each of the unmodified non-coherent state and the unmodified coherent state (for example, transitions 112 and 130) to the invalid state of a data unit of the cache is made in response to an invalidate cache operation command for the data unit.

17. A method of operating a data processing system (for example, 10), the method comprising:
performing a write transaction of data by a first master (for example, 16) that generates a write miss to a cache (for example, 30) of the data processing system, the first master is operably coupled to a system interconnect (for example, 12), the data processing system including a second master (for example, 14) and a memory (for example, 20) operably coupled to the system interconnect;
in response to the write miss, writing the data to the cache;
performing a write through of the data to the memory if a write though required attribute (for example, W) for the data of the write transaction indicates that a write through of the data is required, wherein no write through of the data is performed if the write though required attribute indicates that no write through of the data is required;
searching into at least one other cache (for example, 28) of the data processing system to determine whether the at least one other cache contains a memory address corresponding to the write transaction if the write through required attribute indicates that a write through of the data is required, wherein no searching of the at least one other cache is performed if the write through required attribute indicates that no write through of the data is required.

18. A data processing system (for example, 10), comprising:
a processor (for example, 14), the processor including a cache (for example, 28);
a second master (for example, 16);
a memory (for example, 20), the memory operably coupled to the processor and the second master via a system interconnect (for example, 12);
memory attribute logic (for example, within MMU 42 or elsewhere within processor 14 or system 10) for providing a plurality of attributes associated with locations of the memory, wherein one of the plurality of attributes is a write through required attribute (for example, W);
wherein the cache includes a cache controller (for example, 29), the cache controller including circuitry implementing a set of cache coherency states for data units of the cache, wherein the cache controller utilizes the write through required attribute for determining whether memory coherency is required for one or more locations within the memory.

19. The data system of item 18 further comprising:
a cache coherency manager (for example, 18) operably coupled to the system interconnect, wherein when the write through required attribute indicates that memory coherency is required for a write transaction, the cache coherency manager indicates to other caches (for example, 30, 41) of the data system to perform a cache coherency lookup operation for a memory address of the write transaction.

20. The data system of item 19 wherein when the write through required attribute indicates that memory coherency is not required for the write transaction, no memory coherency transaction in the data system is perform for the write transaction.

What is claimed is:

1. A data processing system, comprising:
a first master, the first master including a cache;
a second master;
a memory, the memory operably coupled to the first master and the second master via a system interconnect;
wherein the cache includes a cache controller, the cache controller implementing a set of cache coherency states for data units of the cache, the cache coherency states including:
an invalid state;
an unmodified non-coherent state, the unmodified non-coherent state indicating that data in a data unit of the cache has not been modified and is not guaranteed to be coherent with data in at least one other storage device of the data processing system; and an unmodified coherent state, the unmodified coherent state indicating that the data of the data unit has not been modified and is coherent with data in the at least one other storage device of the data processing system.

2. The data processing system of claim 1 wherein a transition from the invalid state to the unmodified non-coherent state of a data unit of the cache is made in response to a read miss to the cache wherein the data of the read miss is written to the data unit, wherein no cache coherency operation is performed on any other cache in the data processing system in response to the read miss.

3. The data processing system of claim 1 wherein:
in response to a write cache miss, a transition from the invalid state to the unmodified non-coherent state of a data unit of the cache where the data of the write miss is written, does not generate a cache coherency operation in other caches in the data processing system.

4. The data processing system of claim 1 wherein a transition from the invalid state to the unmodified non-coherent state of a data unit of the cache does not cause a look up operation into other caches of the data processing system to determine whether those caches contain a memory address corresponding to the data being written to the data unit.

5. The data processing system of claim 1 wherein when a data unit of the cache is in the unmodified non-coherent state, snoop transactions directed towards that data unit do not result in a change of coherency state for that data unit.

6. The data processing system of claim 1, wherein in response to a cache miss in which the data of the cache miss is written to a data unit of the cache:
a transition to the unmodified non-coherent state from the invalid state of the data unit of the cache is made in response to a write through required attribute indicating that a write through is not required for the data written to the data unit;
a transition to the unmodified coherent state from the invalid state of the data unit of the cache is made in response to the write through required attribute indicating that a write through is required for the data written to the data unit of the cache.

7. The data processing system of claim 6 wherein:
the cache miss is a write miss;
the data of the write miss is not written in a subsequent copyback bus transaction to the memory if the write through required attribute indicates that a write through is required for the data of the write miss.

8. The data processing system of claim 1 wherein the cache coherency states further include:
a modified non-coherent state, the modified non-coherent state indicating that data in a data unit of the cache has been modified and is not guaranteed to be coherent with the data in the at least one other storage device of the data processing system.

9. The data processing system of claim 8 wherein a transition from the unmodified non coherent state to the modified non-coherent state of a data unit of the cache is made in response to a write hit to the data of the data unit.

10. The data processing system of claim 9 wherein:
when in the unmodified coherent state, a write hit to data of a data unit of the cache generates a write through of the data to the memory;
when in the unmodified non-coherent state, a write hit to the data of a data unit of the cache does not generate a write through operation of the data.

11. The data processing system of claim 8 wherein a transition from the modified non-coherent state to the unmodified non-coherent state of a data unit of the cache is made in response to a flush cache operation command for the data unit without an invalidate cache operation command for the data unit and a write through required attribute indicates that a write through is not required for the data of the data unit.

12. The data processing system of claim 8 wherein a transition from the modified non-coherent state to the unmodified coherent state of a data unit of the cache is made in response to a flush cache operation command for the data unit and a write through required attribute of the data indicates that a write through is required for the data.

13. The data processing system of claim 8 wherein when a write through required attribute for data in a data unit indicates that a write through is not required for the data, a transition from the modified non-coherent state to the invalid state of the data unit of the cache is made in response to:
a flush cache operation command for the data unit without an invalidate cache operation command for the data unit, wherein the data is written to the memory with a copyback bus transaction in response to the flush cache operation command; or
an invalidate cache operation command for the data unit.

14. The data processing system of claim 1 wherein when a write through required attribute indicates that a write through is required for data of a data unit of the cache, a transition to the unmodified coherent state from the unmodified non-coherent state of the data unit of the cache is made in response to a flush cache operation command for the data unit without an invalidate cache operation command for the data unit.

15. The data processing system of claim 1 wherein when a write through required attribute indicates that a write through is not required for the data, a transition to the unmodified non-coherent state from the unmodified coherent state of a data unit of the cache is made in response to a flush cache operation command for the data unit without a invalidate cache operation command for the data unit.

16. The data processing system of claim 1 wherein a transition from each of the unmodified non-coherent state and the unmodified coherent state to the invalid state of a data unit of the cache is made in response to an invalidate cache operation command for the data unit.

17. A method of operating a data processing system, the method comprising:
performing a write transaction of data by a first master that generates a write miss to a cache of the data processing system, the first master is operably coupled to a system interconnect, the data processing system including a second master and a memory operably coupled to the system interconnect;
in response to the write miss, writing the data to the cache;
performing a write through of the data to the memory if a write though required attribute for the data of the write transaction indicates that a write through of the data is required, wherein no write through of the data is performed if the write though required attribute indicates that no write through of the data is required;
searching into at least one other cache of the data processing system to determine whether the at least one other cache contains a memory address corresponding to the write transaction if the write through required attribute indicates that a write through of the data is required, wherein no searching of the at least one other cache is performed if the write through required attribute indicates that no write through of the data is required.

\* \* \* \* \*